(12) United States Patent
Hwang et al.

(10) Patent No.: US 11,349,159 B2
(45) Date of Patent: May 31, 2022

(54) BATTERY MANAGEMENT SYSTEM AND BATTERY PACK INCLUDING SAME

(71) Applicant: LG CHEM, LTD., Seoul (KR)

(72) Inventors: Ji-Won Hwang, Daejeon (KR); Yean-Sik Choi, Daejeon (KR); Ji-Eun Kim, Daejeon (KR); Chang-Hyun Sung, Daejeon (KR); Sang-Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 397 days.

(21) Appl. No.: 16/479,713

(22) PCT Filed: Sep. 4, 2018

(86) PCT No.: PCT/KR2018/010316
§ 371 (c)(1),
(2) Date: Jul. 22, 2019

(87) PCT Pub. No.: WO2019/059565
PCT Pub. Date: Mar. 28, 2019

(65) Prior Publication Data
US 2021/0336301 A1 Oct. 28, 2021

(30) Foreign Application Priority Data
Sep. 19, 2017 (KR) .......................... 10-2017-0120380

(51) Int. Cl.
*H01M 10/48* (2006.01)
*B60L 58/10* (2019.01)
(Continued)

(52) U.S. Cl.
CPC .......... *H01M 10/486* (2013.01); *B60L 58/10* (2019.02); *H01M 10/425* (2013.01);
(Continued)

(58) Field of Classification Search
CPC . H01M 2010/4271; H01M 2010/4278; H01M 2220/20; H01M 10/486;
(Continued)

(56) References Cited

U.S. PATENT DOCUMENTS 8,723,481 B2 * 5/2014 Zhang ................. H01M 10/486
320/118
2008/0272736 A1 11/2008 Tien et al.
(Continued)

FOREIGN PATENT DOCUMENTS

CN 101692502 A 4/2010
CN 202501568 U 10/2012
(Continued)

OTHER PUBLICATIONS

Extended European Search Report dated Oct. 16, 2020, issued in corresponding European Patent Application No. 18859461.8.
(Continued)

*Primary Examiner* — Anthony R Jimenez
(74) *Attorney, Agent, or Firm* — Morgan, Lewis & Bockius LLP

(57) ABSTRACT

Provided are a battery management system and a battery pack including the same. The battery management system includes a plurality of slave controllers, a plurality of temperature sensors, and a master controller. The plurality of temperature sensors are disposed in a plurality of different regions within the battery pack in a distributed fashion. The master controller is communicably coupled to the plurality of temperature sensors through a wired communication network. The master controller is communicably coupled to the plurality of slave controllers through a wireless communication network. The master controller determines a posi-
(Continued)

tion of each of the plurality of slave controllers based on a temperature value of each region measured by the plurality of temperature sensors.

10 Claims, 4 Drawing Sheets

(51) Int. Cl.
H02J 7/00 (2006.01)
H01M 10/42 (2006.01)
(52) U.S. Cl.
CPC ....... *H01M 10/4207* (2013.01); *H02J 7/0069* (2020.01); *H02J 7/007192* (2020.01); *B60Y 2200/91* (2013.01); *H01M 2010/4271* (2013.01); *H01M 2010/4278* (2013.01); *H01M 2220/20* (2013.01)
(58) Field of Classification Search
CPC ............ H01M 10/425; H01M 2220/00; B60Y 2200/91; H02J 7/007192; H02J 7/0069; B60L 58/10; B60L 2240/54; B60L 2240/545; B60L 58/00; B60L 58/12; B60L 58/24; B60L 58/26; B60L 58/27; B60L 53/00; G01R 19/00
USPC .......................................................... 429/90
See application file for complete search history.

(56) References Cited

U.S. PATENT DOCUMENTS

| 2009/0146610 | A1 | 6/2009 | Trigiani |
| 2011/0175574 | A1 | 7/2011 | Sim et al. |
| 2013/0069596 | A1 | 3/2013 | Ochiai |
| 2014/0354291 | A1 | 12/2014 | Kikuchi et al. |
| 2014/0365792 | A1 | 12/2014 | Yun |
| 2017/0077722 | A1 | 3/2017 | Jung |

FOREIGN PATENT DOCUMENTS

| EP | 2765643 | 8/2014 |
| EP | 2 776 903 A | 9/2014 |
| JP | 2011-034964 A | 2/2011 |
| JP | 2014-239639 A | 12/2014 |
| JP | 2015-065777 A | 4/2015 |
| KR | 10-2010-0097504 A | 9/2010 |
| KR | 10-2011-0013747 A | 2/2011 |
| KR | 10-2014-0028350 A | 3/2014 |
| KR | 10-2014-0060801 A | 5/2014 |
| KR | 10-2014-0073949 A | 6/2014 |
| KR | 10-2014-0143076 A | 12/2014 |
| KR | 10-2015-0006196 A | 1/2015 |
| KR | 10-2015-0110427 A | 10/2015 |
| KR | 10-2016-0111234 A | 9/2016 |
| WO | 2011-155034 A1 | 12/2011 |
| WO | 2012/061262 A | 5/2012 |
| WO | 2013/051157 A1 | 4/2013 |

OTHER PUBLICATIONS

International Search Report dated Dec. 20, 2018, issued in corresponding International Application No. PCT/KR2018/010316.
First Notification of Office Action dated Aug. 18, 2020, issued in corresponding Japanese Patent Application No. 2019-540569.
Chinese Office Action dated Nov. 17, 2021, issued in corresponding Chinese Patent Application No. 201880009689.0.
Wang Haifei, The Design of Battery Monitoring and Equalization for Electric Vehicle, Mar. 31, 2015, Chinese Doctor and Masters's Theses Full-text Database (Master) Engineering Science and technology II, vol. 3, 2015.

* cited by examiner

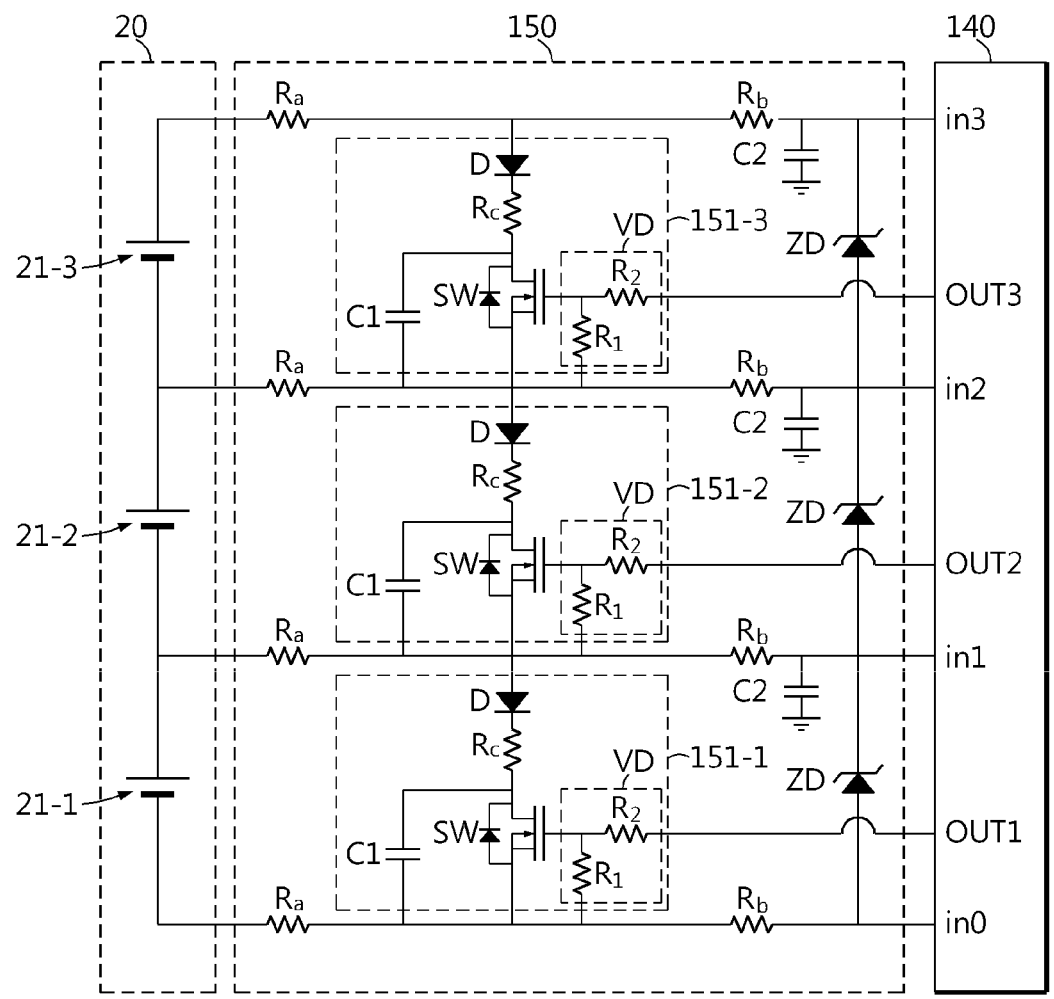

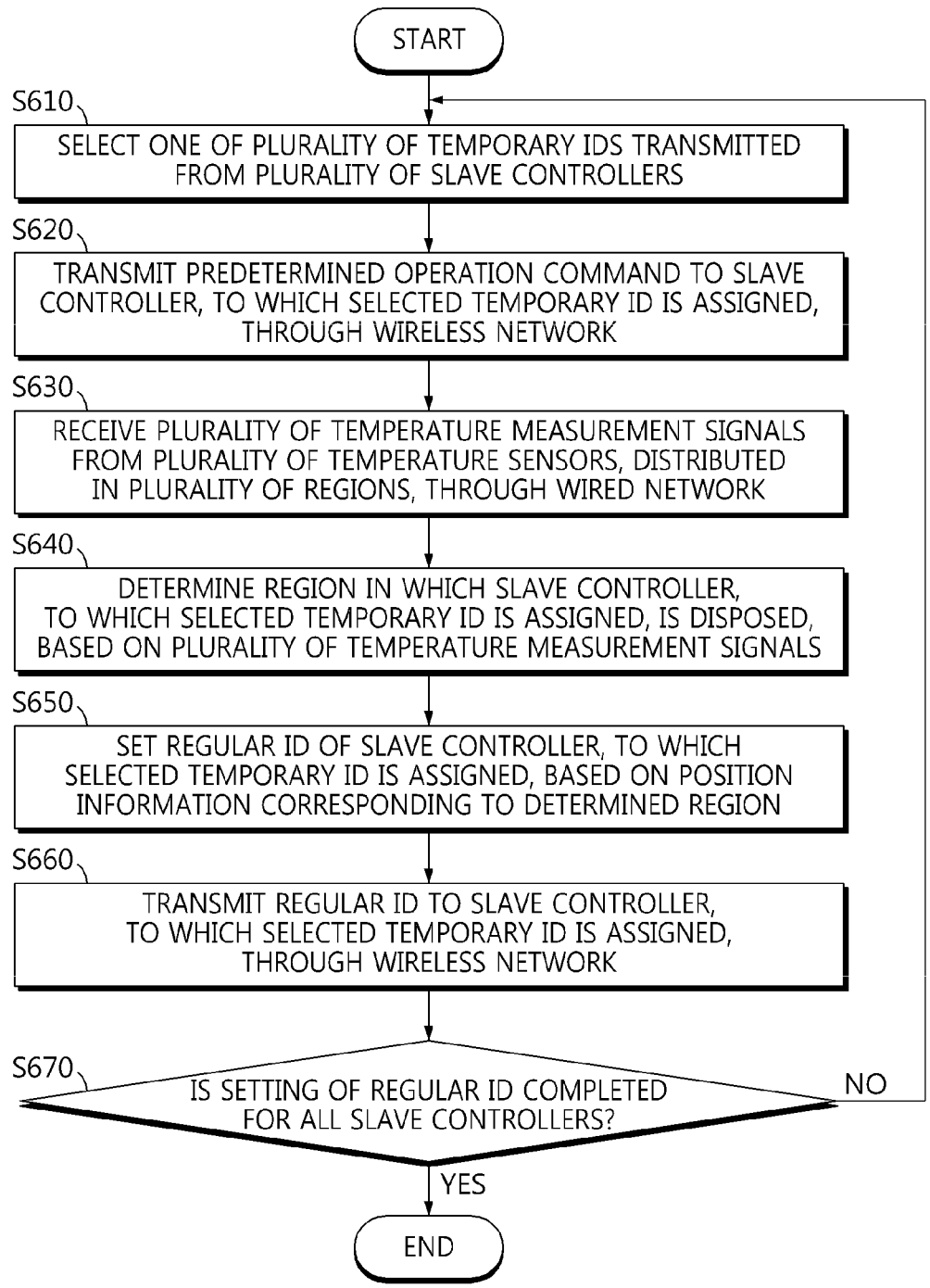

BATTERY MANAGEMENT SYSTEM AND BATTERY PACK INCLUDING SAME

TECHNICAL FIELD

The present disclosure relates to a battery management system for managing a plurality of battery modules by using a wireless network and a battery pack including the same.

The present application claims priority to Korean Patent Application No. 10-2017-0120380 filed on Sep. 19, 2017 in the Republic of Korea, the disclosures of which are incorporated herein by reference.

BACKGROUND ART

Recently, as the demand for portable electronic products such as notebook computers, video cameras, and mobile phones is rapidly increasing and the development of electric vehicles, energy storage batteries, robots, satellites, and the like is being regularized, studies on high performance secondary batteries capable of repeated charge and discharge have been actively conducted.

Currently available secondary batteries include nickel-cadmium batteries, nickel-hydrogen batteries, nickel-zinc batteries, and lithium secondary batteries. Of these, lithium secondary batteries have almost no memory effect as compared with nickel-based secondary batteries, and are thus free for charge and discharge and have a very low self-discharge rate and a high energy density. Due to these advantages, lithium secondary batteries have attracted attention.

A battery pack applied to an electric vehicle or the like typically includes a plurality of battery modules and a plurality of slave controllers connected in series and/or in parallel. Each slave controller monitors and controls the state of the battery module to be managed. Recently, as large-capacity and high-output battery packs are required, the number of battery modules included in the battery pack is also increasing. In order to efficiently manage each battery module included in the battery pack, a multi-slave structure is disclosed. The multi-slave structure includes a plurality of slave controllers installed in each battery module and a master controller that controls the plurality of slave controllers as a whole.

In a battery pack having a multi-slave structure, in order for a master controller to collect state information of a plurality of battery modules from a plurality of slave controllers and transmit a control command for the plurality of battery modules to the plurality of slave controllers, each slave controller has to be assigned an ID indicating a physical or electrical position of a battery module to be managed.

Patent Literature 1 discloses a technique for sequentially assigning IDs to a plurality of slave controllers. Patent Literature 1 proposes a method of assigning an ID in a state in which a master controller is connected to each slave controller by wire. However, in the ID assigning method according to Patent Literature 1, since it is assumed that the master controller is connected to each slave controller by wire, there are concerns such as disconnection of electric wires and space restriction is great. In addition, in order to set the IDs in the order of hardware positions of the respective slave controllers, a process of measuring a potential difference by the batteries managed by each slave controller must be preceded.

(Patent Literature 1) Korean Patent Application Publication No. 10-2011-0013747 (published on Feb. 10, 2011).

DISCLOSURE

Technical Problem

The present disclosure is designed to solve the problems of the related art, and therefore the present disclosure is directed to providing a battery management system, which is capable of determining positions of a plurality of slave controllers in a multi-slave structure and assigning different regular IDs to the plurality of slave controllers based on the determined positions, and a battery pack including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery management system including: a plurality of slave controllers electrically connectable one-to-one to a plurality of battery modules and disposed one-to-one in a plurality of regions; a plurality of temperature sensors disposed one-to-one in the plurality of regions; and a master controller communicably coupled to the plurality of temperature sensors by a wired network and communicably coupled to the plurality of slave controllers by a wireless network. Each of the plurality of slave controllers may be configured to transmit a temporary ID, which is preassigned to itself, to the master controller through the wireless network. The master controller may be configured to: select one of a plurality of temporary IDs received from the plurality of slave controllers; transmit a predetermined operation command to a slave controller, to which the selected temporary ID is preassigned, through the wireless network; after transmitting the operation command, receive a plurality of temperature measurement signals from the plurality of temperature sensors through the wired network; and determine a region in which the slave controller, to which the selected temporary ID is preassigned, is disposed among the plurality of regions, based on the plurality of temperature measurement signals.

Each of the plurality of slave controllers may include a balancing unit electrically connectable to a plurality of battery cells included in a battery module to which itself is electrically connected. The balancing unit is configured to selectively discharge at least one of the plurality of battery cells. The operation command may include a forced balancing signal. Each of the plurality of slave controllers may be configured to activate the balancing unit included in itself when the forced balancing signal is received through the wireless network. The balancing unit may be configured to discharge at least one of the plurality of battery cells electrically connected to the balancing unit when the balancing unit is activated.

In addition, the master controller may be configured to: determine a temperature value of each of the plurality of regions based on the plurality of temperature measurement signals; and determine that the slave controller, to which the selected temporary ID is preassigned, is disposed in a region having a maximum temperature value among the plurality of regions.

The wired network may include a plurality of sensing lines electrically connected one-to-one between the plurality of temperature sensors and a plurality of input ports provided in the master controller.

In addition, the master controller may be configured to set a regular ID of the slave controller, to which the selected temporary ID is preassigned, based on position information corresponding to the determined region. The master controller may be configured to transmit the regular ID to the slave controller, to which the selected temporary ID is preassigned, through the wireless network.

In another aspect of the present disclosure, there is also provided a battery pack including the battery management system.

In another aspect of the present disclosure, there is also provided an electric vehicle including the battery pack.

Advantageous Effects

According to at least one of the embodiments of the present disclosure, in a multi-slave structure, positions of a plurality of slave controllers may be determined based on temperature values of regions measured by a plurality of temperature sensors distributed in a plurality of different regions within a battery pack. Accordingly, regular IDs mapped to different position information may be assigned to the plurality of slave controllers.

In addition, according to at least one of the embodiments of the present disclosure, data indicating states of a plurality of battery modules mounted at different positions within the battery pack may be collected by using regular IDs individually assigned to a plurality of slave controllers, and the failure of each battery module may be diagnosed based on the collected data.

The effects of the present disclosure are not limited to the above-described effects, and other effects not described can be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 4 illustrates an ID assignment table used when a master controller assigns different regular IDs to a plurality of slave controllers, according to an embodiment of the present disclosure.

FIG. 5 illustrates a configuration of a balancing unit included in a slave controller, according to an embodiment of the present disclosure.

FIG. 6 is a flowchart of a method by which a master controller assigns different regular IDs to a plurality of slave controllers, according to an embodiment of the present disclosure.

MODE FOR DISCLOSURE

Figure 1:
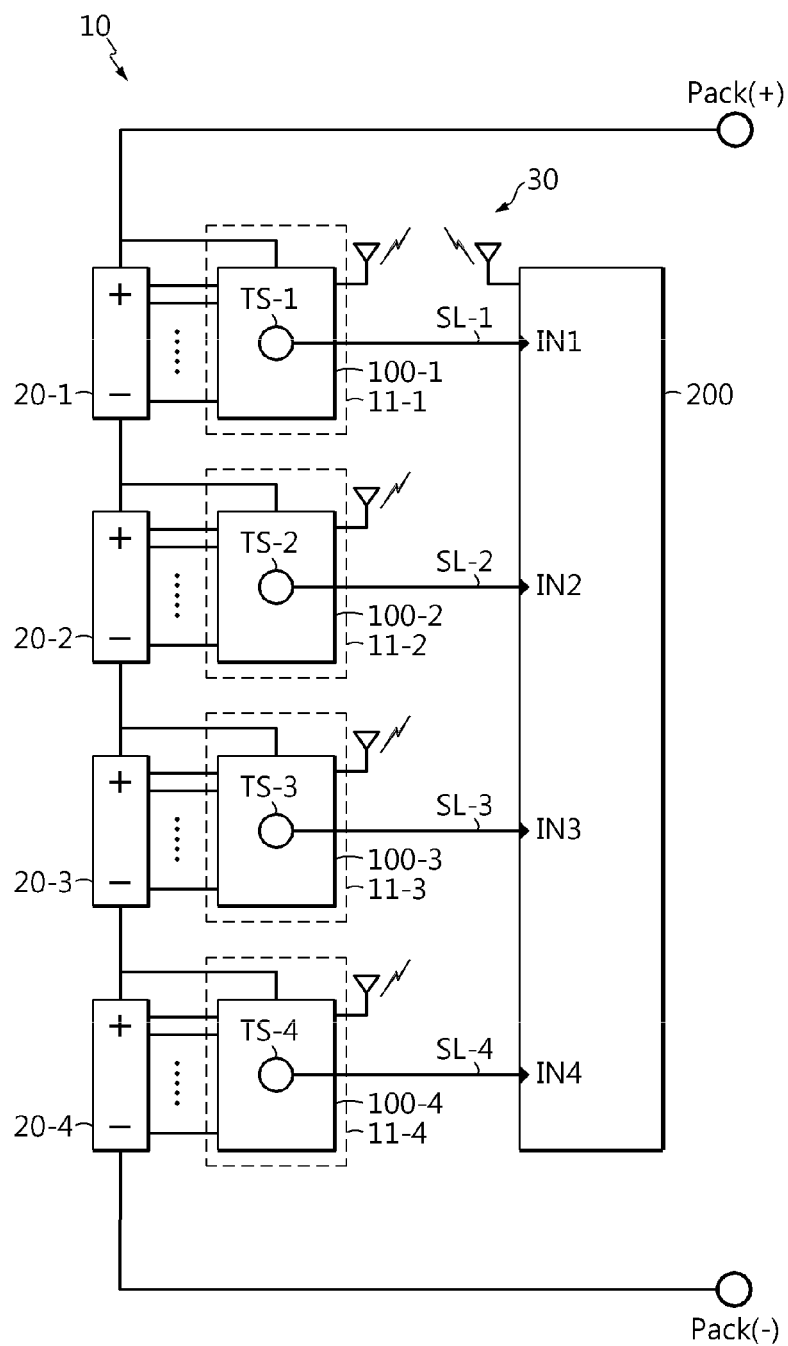
FIG. 1 is a schematic configuration diagram of a battery management system and a battery pack including the same, according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, it should be understood that various equivalents and alternatives can be made at the time of filing the present disclosure since the descriptions of the specification and the features shown in the drawings are no other than preferred embodiments without reflecting all the technical ideas of the present disclosure.

However, in the following descriptions and the accompanying drawings, descriptions of well-known functions or constructions will be omitted if they are considered to unnecessarily obscure the gist of the present disclosure.

It should be understood that terms including ordinals, such as first, second, etc., are used for the purpose of distinguishing one of various components from the others, and are not used to limit the components by such terms.

It should be understood that terms such as "comprise", "include", and "have", when used herein, specify the presence of stated elements, but do not preclude the presence or addition of one or more other elements. In addition, the terms "control unit" as used herein represent a unit for processing at least one function or operation, which may be implemented by hardware, software, or a combination thereof.

It should be understood that when a region is referred to as being "connected to" or "coupled to" another region, it may be "directly" connected or coupled to the other region, or may be "indirectly" connected or coupled to the other region, with intervening regions being disposed therebetween.

In this specification, the symbol "-k" is used to distinguish the components having the same name.

FIG. 1 is a schematic configuration diagram of a battery management system 30 and a battery pack 10 including the same, according to an embodiment of the present disclosure.

Referring to FIG. 1, the battery pack 10 may be mounted on various devices using electric energy, such as electric vehicles. The battery pack 10 includes a plurality of battery modules 20-1 to 20-$n$ (for example, n=4) and a battery management system 30. In this case, each battery module 20 includes a plurality of battery cells electrically connected in series and/or in parallel. The battery management system 30 includes a plurality of slave controllers 100-1 to 100-$n$, a plurality of temperature sensors TS-1 to TS-n, and a master controller 200.

Hereinafter, for convenience of description, as illustrated in FIG. 1, it is assumed that the battery pack 10 includes four battery modules 20-1 to 20-4, and the battery management system 30 includes four slave controllers 100-1 to 100-4 and four temperature sensors TS-1 to TS-4.

The plurality of slave controllers 100-1 to 100-4 are installed so as to correspond one-to-one to the plurality of battery modules 20-1 to 20-4 included in the battery pack 10. Each of the plurality of slave controllers 100-1 to 100-4 is electrically connected to one battery module 20 in which the slave controller itself is installed among the plurality of battery modules 20-1 to 20-4. For example, the first slave controller 100-1 is electrically connected to the first battery module 20-1, the second slave controller 100-2 is electrically connected to the second battery module 20-2, the third slave controller 100-3 is electrically connected to the third battery module 20-3, and the fourth slave controller 100-4 is electrically connected to the fourth battery module 20-4.

Each slave controller 100 performs various control functions (for example, charging, discharging, balancing, and the like) for detecting the overall state (for example, voltage, current, temperature, and the like) of the battery module 20 electrically connected to the slave controller 100, and adjusting the state of the battery module 20. In this case, each control function may be performed by each slave controller 100 directly based on the state of the battery module 20, or may be performed according to a command from the master controller 200.

The battery pack 10 is provided with a plurality of regions 11-1 to 11-4. The plurality of slave controllers 100-1 to 100-4 and the plurality of temperature sensors TS-1 to TS-4 are disposed one-to-one in the plurality of regions 11-1 to 11-4 provided in the battery pack 10. That is, as illustrated in FIG. 1, the plurality of slave controllers 100-1 to 100-4 and the plurality of temperature sensors TS-1 to TS-4 may be disposed one-by-one in the plurality of regions 11-1 to 11-4. For example, each temperature sensor TS may be detachably attached to the surface of each slave controller 100.

The master controller 200 is communicably coupled to the plurality of temperature sensors TS-1 to TS-4 by a wired network. In addition, the master controller 200 is communicably coupled to the plurality of slave controllers 100-1 to 100-4 by a wireless network. The wire network includes a plurality of sensing lines SL-1 to SL-4 electrically connected one-to-one between the plurality of temperature sensors TS-1 to TS-4 and a plurality of input ports IN1 to IN4 provided in the master controller 200.

Figure 2:
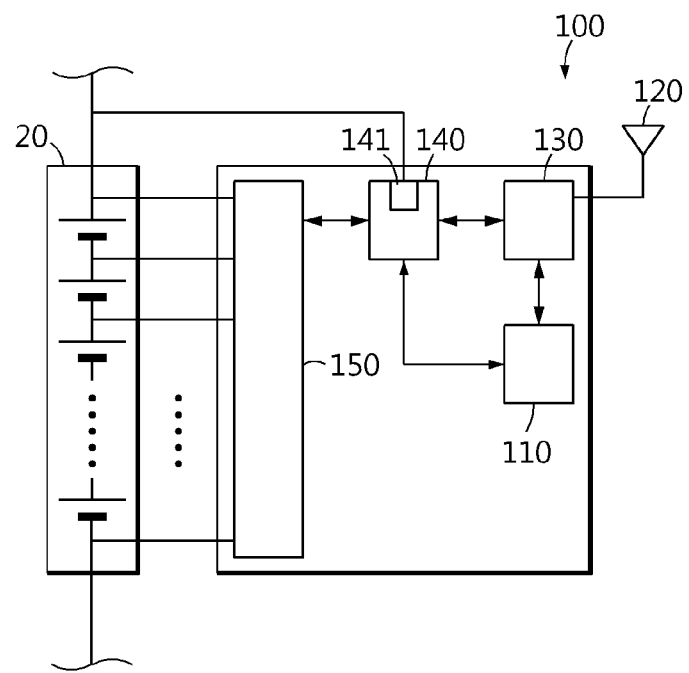
FIG. 2 is a schematic configuration diagram of a slave controller illustrated in FIG. 1.

FIG. 2 is a schematic configuration diagram of the slave controller 100 illustrated in FIG. 1.

Referring to FIG. 2, each of the plurality of slave controllers 100-1 to 100-4 includes a slave memory 110, a slave antenna 120, a slave communication unit 130, a slave control unit 140, and a balancing unit 150.

Temporary IDs are previously stored in the slave memory 110. The temporary IDs are previously assigned to the slave controllers 100 before the slave controllers 100 are installed in the battery pack 10. The temporary IDs may be used when each of the plurality of slave controllers 100-1 to 100-4 performs wireless communication with the master controller 200 during a period before regular IDs described later are assigned. The temporary ID preassigned to one of the plurality of slave controllers 100-1 to 100-4 may be different from the temporary IDs preassigned to the remaining slave controllers. Each of the temporary IDs may be used by the master controller 200 when the master controller 200 distinguishes each slave controller 100 from the remaining slave controllers 100 before the regular IDs are assigned to the slave controller 100. However, each of the temporary IDs does not indicate where each slave controller 100 to which each temporary ID is assigned is installed among the plurality of regions 11-1 to 11-4. Therefore, when each temporary ID is replaced with the regular ID described later, the master controller 200 can determine where each slave controller 100 is installed among the plurality of battery modules 20-1 to 20-4, and accordingly, can selectively control each slave controller 100 or selectively communicate with each slave controller 100.

The slave memory 110 is not particularly limited as long as the slave memory is a known information storage means known to be capable of recording, erasing, updating, and reading data. For example, the slave memory 110 may be a DRAM, an SDRAM, a flash memory, a ROM, an EEPROM, a register, or the like. The slave memory 110 may store program codes in which processes executable by the slave control unit 140 are defined.

The slave memory 110 may be physically separated from the slave control unit 140, or may be integrated with the slave control unit 140 in a chip or the like.

The slave antenna 120 and the slave communication unit 130 are operatively coupled to each other. The slave communication unit 130 includes a radio circuit which demodulates a radio signal received by the slave antenna 120. The slave communication unit 130 may also modulate a signal to be transmitted to the master controller 200 through the slave antenna 120 and then provide the modulated signal to the slave antenna 120. The slave antenna 120 may transmit, to the master controller 200, a radio signal corresponding to the signal modulated by the slave communication unit 130.

The slave control unit 140 includes at least one processor and is operatively coupled to the slave memory 110 and the slave communication unit 130. The slave control unit 140 is configured to manage the overall operation of the slave controller 100 including the slave control unit 140.

The slave control unit 140 may include a sensing unit configured to detect the state of the battery module 20. For example, the sensing unit may include at least one of a voltage measurement circuit which detects a voltage across the battery module 20, a current measurement circuit which detects a current flowing through the battery module 20, and a temperature detection circuit which detects a temperature of the battery module 20.

The slave control unit 140 provides, to the slave communication unit 130, sensing information indicating the state of the battery module 20 detected by the sensing unit. Accordingly, the slave communication unit 130 transmits the radio signal corresponding to the sensing information to the master controller 200 through the wireless network by using the slave antenna 120.

The slave control unit 140 may further include a power supply circuit 141. The power supply circuit 141 generates at least one power supply voltage by using electric energy supplied from the battery module 20 in which the slave controller 100 is installed. The power supply voltage generated by the power supply circuit 141 may be provided to the slave memory 110, the slave antenna 120, and the slave communication unit 130. In addition, the power supply voltage generated by the power supply circuit 141 may be provided to each processor included in the slave control unit 140.

The slave control unit 140 may transmit the temporary ID stored in the slave memory 110 to the master controller 200 through the wireless network by using the slave antenna 120 and the slave communication unit 130.

In order to execute various control logics, each processor included in the slave control unit 140 may optionally include a processor, an application-specific integrated circuit (ASIC), another chipset, a logic circuit, a register, a communication modem, a data processing apparatus, and the like, which are known to those skilled in the art. At least one of the various control logics of the slave control unit 140 may be combined, and the combined control logics may be written in a computer-readable code system and recorded in a computer-readable recording medium. The recording medium is not particularly limited as long as the recording medium can be accessed by a processor included in a computer. For example, the recording medium includes at least one selected from the group consisting of a ROM, a RAM, a register, a CD-ROM, a magnetic tape, a hard disk, a floppy disk, and an optical data recording device. In addition, the code system may be modulated into a carrier signal and included in a communication carrier at a particular time point, and may be stored and executed in a networked computer in a distributed fashion. In addition, functional programs, codes, and code segments for implementing the combined control logics may be easily construed by programmers skilled in the art to which the present disclosure pertains.

The balancing unit 150 is configured to suppress the voltage deviation and/or the remaining capacity deviation between the plurality of battery cells by selectively discharging at least one of the plurality of battery cells included in each battery module 20 when balancing unit 150 is activated. The slave control unit 140 may output a control signal for activating the balancing unit 150 in response to a balancing signal from the master controller 200. The balancing unit 150 will be described below in more detail with reference to FIG. 5.

Figure 3:
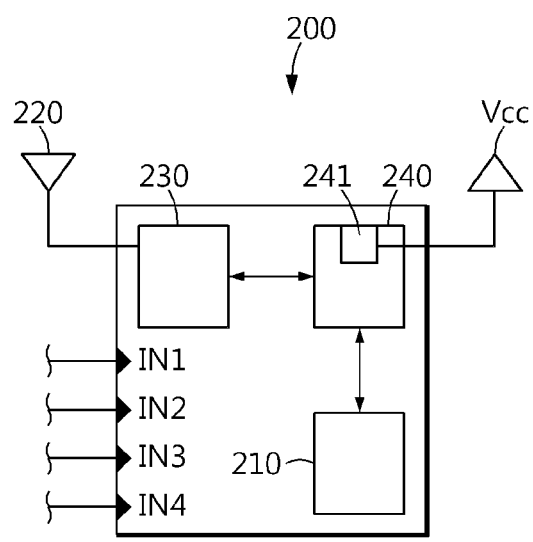
FIG. 3 is a schematic configuration diagram of a master controller illustrated in FIG. 1.

FIG. 3 is a schematic configuration diagram of the master controller 200 illustrated in FIG. 1.

Referring to FIG. 3, the master controller 200 may include a master memory 210, a master antenna 220, a master communication unit 230, and a master control unit 240.

The master memory 210 stores temporary IDs wirelessly transmitted from the plurality of slave controllers 100-1 to 100-4. In addition, the master memory 210 stores an ID assignment table. The ID assignment table includes a plurality of pieces of position information and a plurality of regular IDs. The plurality of pieces of position information are mapped so as to correspond one-to-one to the plurality of regular IDs.

The plurality of pieces of position information are information indicating where the plurality of temperature sensors TS-1 to TS-4 are positioned in the battery pack 10. That is, a relationship between the plurality of temperature sensors TS-1 to TS-4 and the plurality of regions 11-1 to 11-4 may be defined by the plurality of pieces of position information. However, the master controller 200 cannot determine to which of the plurality of pieces of position information the plurality of slave controllers 100-1 to 100-4 correspond until the regular IDs are assigned to the plurality of slave controllers 100-1 to 100-4.

The master memory 210 is not particularly limited as long as the master memory is a known information storage means known to be capable of recording, erasing, updating, and reading data. For example, the master memory 210 may be a DRAM, an SDRAM, a flash memory, a ROM, an EEPROM, a register, or the like. The master memory 210 may store program codes in which processes executable by the slave control unit 140 are defined.

Meanwhile, the master memory 210 may be physically separated from the master control unit 240, or may be integrated with the master control unit 240 in a chip or the like.

The master antenna 220 and the master communication unit 230 are operatively coupled to each other. The master communication unit 230 includes a radio circuit which demodulates a radio signal received by the master antenna 220. The master communication unit 230 may also modulate a signal to be transmitted to the slave controller 100 and then transmit the modulated signal through the wireless network by using the master antenna 220. The master antenna 220 may selectively transmit a radio signal corresponding to the signal modulated by the master communication unit 230 to at least one of the plurality of slave controllers 100-1 to 100-4.

The master control unit 240 may further include a power supply circuit 241. The power supply circuit 241 of the master control unit 240 generates at least one power supply voltage by using electric energy supplied from the battery module 20, an external power supply Vcc, or a power supply provided in the power supply circuit 241. The power supply voltage generated by the power supply circuit 241 of the master control unit 240 may be provided to the master memory 210, the master antenna 220, and the master communication unit 230. The power supply voltage generated by the power supply circuit 241 of the master control unit 240 may be provided to each processor included in the master control unit 240.

The master control unit 240 may determine the temperature value detected by each of the plurality of temperature sensors TS-1 to TS-4 based on the signals individually applied to the plurality of input ports (IN1 to IN4 in FIG. 1).

The master control unit 240 includes at least one processor and is operatively coupled to the master memory 210 and the master communication unit 230. The master control unit 240 is configured to manage the overall operation of the master controller 200. In addition, the master control unit 240 may calculate a state of charge (SOC) and/or a state of health (SOH) of each of the plurality of slave controllers 100-1 to 100-4 based on the radio signal corresponding to the sensing information generated by each of the plurality of slave controllers 100-1 to 100-4 among radio signals received through the master antenna 220. In addition, the master control unit 240 may generate information for controlling charging, discharging, and/or balancing of each of the plurality of slave controllers 100-1 to 100-4 based on the calculated SOC and/or SOH, and selectively transmit the generated information to at least one of the plurality of slave controllers 100-1 to 100-4 through the master antenna 220 and the master communication unit 230.

In order to execute various control logics, each processor included in the master control unit 240 may optionally include a processor, an application-specific integrated circuit (ASIC), another chipset, a logic circuit, a register, a communication modem, a data processing apparatus, and the like, which are known to those skilled in the art. At least one of the various control logics of the master control unit 240 may be combined, and the combined control logics may be written in a computer-readable code system and recorded in a computer-readable recording medium. The recording medium is not particularly limited as long as the recording medium can be accessed by a processor included in a computer. For example, the recording medium includes at least one selected from the group consisting of a ROM, a RAM, a register, a CD-ROM, a magnetic tape, a hard disk, a floppy disk, and an optical data recording device. In addition, the code system may be modulated into a carrier signal and included in a communication carrier at a particular time point, and may be stored and executed in a networked computer in a distributed fashion. In addition, functional programs, codes, and code segments for implementing the combined control logics may be easily construed by programmers skilled in the art to which the present disclosure pertains.

FIG. 4 illustrates an ID assignment table used when the master controller 200 assigns different regular IDs to the plurality of slave controllers 100, according to an embodiment of the present disclosure.

Referring to FIG. 4, the ID assignment table 400 is previously stored in the memory 210 and includes a plurality of data arrays 410, 420, 430, and 440. In this case, the number of data arrays may be the same as the number of the plurality of regions 11-1 to 11-4. In the above description, it is assumed that the number of regions 11-1 to 11-4 is four, and the number of data arrays included in the ID assignment table is also four.

Each data array basically includes a regular ID and position information indicating one of the plurality of regions 11-1 to 11-4. For example, first position information L1 may indicate the region 11-1 at which the first temperature sensor TS-1 is disposed, second position information L2 may indicate the region 11-2 at which the second temperature sensor TS-2 is disposed, third position information L3 may indicate the region 11-3 at which the third temperature sensor TS-3 is disposed, and fourth position information L4 may indicate the region 11-4 at which the fourth temperature sensor TS-4 is disposed. The regular ID and the position information contained in the same data array are mapped to each other. For example, the first position information L1 is mapped to ID1, the second position information L2 is mapped to ID2, the third position information L3 is mapped to ID3, and the fourth position information L4 is mapped to ID4.

FIG. 5 illustrates the configuration of the balancing unit 150 included in the slave controller 100, according to an embodiment of the present disclosure. For convenience of description, it is assumed that each battery module 20 includes three battery cells 21-1 to 21-3.

Referring to FIG. 5, the balancing unit 150 is electrically connected between the battery module 20 and the slave control unit 140. The slave control unit 140 collects the sensing signals corresponding to the voltages of the plurality of battery cells 21-1 to 21-3 included in the battery module 20 through a plurality of input ports in0, in1, in2, and in3, and determines the voltages of the plurality of battery cells 21-1 to 21-3 based on the collected sensing signals. For example, the voltage of the battery cell 21-1 may be determined based on a potential difference between the input ports in0 and the input port in1.

The balancing unit 150 includes a plurality of balancing circuits 151-1 to 151-3. The number of balancing circuits 151 is the same as the number of battery cells 21 included in the battery module 20.

Each of the plurality of balancing circuits 151-1 to 151-3 includes a balancing resistor Rc and a balancing switch SW. Each of the plurality of balancing circuits 151-1 to 151-3 may further include at least one of a diode D, a capacitor C1, a voltage divider VD, and a Zener diode ZD. The voltage divider VD includes two resistors R1 and R2 connected in series.

A series circuit of the diode D, the balancing resistor Rc, and the balancing switch SW is connected between both ends of each of the plurality of battery cells 21-1 to 21-3. The diode D may be connected in series to the balancing resistor Rc and the balancing switch SW so as to block a reverse current. The Zener diode ZD is connected between both ends of each of the plurality of battery cells 21-1 to 21-3 independently of the series circuit of the diode D, the balancing resistor Rc, and the balancing switch SW.

The balancing switch SW may be turned on or off according to a control signal from the electrical connection to one of a plurality of output terminals OUT1, OUT2, and OUT3 provided in the slave control unit 140 and electrically connected to the balancing switch SW. For example, while the output terminal OUT2 outputs a control signal having a first voltage of a predetermined level, the first voltage may be lowered to a second voltage by the voltage divider VD, and the balancing switch SW of the balancing circuit 151-2 may be turned on by the second voltage.

The balancing switch SW may be a MOSFET, and a gate of the MOSFET may be connected to a common node of the two resistors R1 and R2 included in the voltage divider VD. In this case, the capacitor C1 is connected between a drain and a source of the MOSFET, and the voltage corresponding to the control signal from the slave control unit 140 may be distributed by the voltage divider VD and applied to the gate of the MOSFET.

When the battery cell 21-1 has a higher voltage or a higher remaining capacity than those of the remaining battery cells 21-1 and 21-2, the balancing switch SW1 of the balancing circuit 151-1 is changed from a turned-off state to a turned-on state, and thus electric energy of the battery cell 21-1 is consumed by the balancing resistor Rc of the balancing circuit 151-1.

Meanwhile, in FIG. 5, Ra is a diagnosis resistor and used to detect the failure of the balancing unit 150. The failure of the balancing unit 150 may be, for example, disconnection of an electric wire in the balancing unit 150, malfunction of the balancing switch SW, and the like. In addition, in FIG. 5, Rb and C2 are respectively a protective resistor and a protective capacitor and function as an RC filter. The RC filter alleviates a noise (for example, a sudden change in current) flowing into the sensing unit of the slave controller 100.

FIG. 6 is a flowchart of a method by which the master controller assigns different regular IDs to the plurality of slave controllers, according to an embodiment of the present disclosure.

Referring to FIG. 6, in step S610, the master controller 200 selects one of a plurality of temporary IDs stored in the master memory 210. In this case, the master controller 200 may select one of the temporary IDs of the slave controllers 100-1 to 100-4 to which the regular IDs are not yet set.

The plurality of temporary IDs stored in the memory 210 may be those transmitted from the plurality of slave controllers 100-1 to 100-4 via the wireless network prior to step S610. Hereinafter, for the sake of understanding, it is assumed that the temporary ID of the slave controller 100-2 is selected in step S610.

In step S620, the master controller 200 transmits a predetermined operation command to the slave controller 100-2, to which the temporary ID selected in step S610 is preassigned, through the wireless network. Accordingly, the slave controller 100-2 may perform a function corresponding to the operation command transmitted in step S620. For example, when a forced balancing signal is included in the operation command, the slave controller 100-2 activates the balancing unit 150 included in the slave controller 100-2 in response to the forced balancing signal. At this time, even when the difference in remaining capacity between the plurality of battery cells 21-1 to 21-3 included in the battery module 20-2 is less than a predetermined value, the forcible balancing signal may be a signal which induces the turn-on of the balancing switch SW of at least one balancing circuit 151. When the balancing unit 150 is activated by the forced balancing signal, the slave controller 100-2 may discharge the battery cell having the highest SOH among the plurality of battery cells 21 included in the battery module 20-2 to which the slave controller 100-2 is electrically connected.

When the function such as balancing is performed by the slave controller 100-2 in response to the operation command from the master controller 200, heat is generated in the balancing unit 150 of the slave controller 100-2. Therefore, the temperature of the region 11-2 in which the slave controller 100-2 is disposed will be higher than the temperature of the remaining regions 11-1, 11-3, and 11-4.

In step S630, the master controller 200 receives a plurality of temperature measurement signals TS-1 to TS-4 from the plurality of temperature sensors TS-1 to TS-4 through the wired network including the plurality of sensing lines SL-1 to SL-4. As illustrated in FIG. 1, the plurality of temperature sensors TS-1 to TS-4 are distributed in the plurality of different regions 11-1 to 11-4 within the battery pack 10.

In step S640, the master controller 200 determines the region in which the slave controller 100-2, to which the temporary ID selected in step S610 is preassigned, is disposed among the plurality of regions 11-1 to 11-4, based on the plurality of temperature measurement signals received in step S630.

Specifically, the master controller 200 determines a temperature value of each of the plurality of regions 11-1 to 11-4 based on a plurality of temperature measurement signals. In this case, the master controller 200 may determine that the slave controller 100-2 is disposed in the region having the maximum temperature value among the plurality of regions 11-1 to 11-4. Alternatively, the master controller 200 may determine that the slave controller 100-2 is disposed in the region in which the temperature increase amount is the largest among the plurality of regions 11-1 to 11-4 after step S620. It will be readily understood by those skilled in the art that since the operation command transmitted in step S620 will be received only by the slave controller 100-2, it is determined in step S640 that the slave controller 100-2 is disposed in the region 11-2.

In step S650, the master controller 200 sets the regular ID of the slave controller 100-2 based on the position information corresponding to the region 11-2 determined in step S640. In this case, the master controller 200 may use the ID assignment table 400 illustrated in FIG. 4. For example, since the region 11-2 corresponds to the position information L2 stored in the data array 420 of the ID assignment table 400, the master controller 200 may set ID2, which is mapped to the position information L2, as the regular ID of the slave controller 100-2.

In step S660, the master controller 200 may transmit the regular ID ID2 set in step S650 to the slave controller 100-2, to which the temporary ID selected in step S610 is preassigned, through the wireless network. Accordingly, the slave controller 100-2 may store the regular ID (ID2) transmitted from the master controller 200 in the slave memory 110 of the slave controller 100-2. Alternatively, the slave controller 100-2 may replace its own temporary ID with the regular ID (ID2).

In step S670, the master controller 200 determines whether the setting of the regular IDs for all the slave controllers 100-1 to 100-4 corresponding to the plurality of temporary IDs stored in the memory 210 is completed. When the result of step S670 is "NO", the master controller 200 returns to step S610. When returning to step S610, it is apparent to those skilled in the art that one temporary ID among the slave controllers 100-1, 100-3, and 100-4 other than the slave controller 100-2 will be selected. When the result of step S670 is "YES", the master controller 200 ends the setting of the regular IDs for the plurality of slave controllers 100-1 to 100-4.

The above-described embodiments of the present disclosure are not implemented only by the devices and methods and may be implemented by the program for realizing the functions corresponding to the configuration of the embodiments of the present disclosure or the recording medium having recorded thereon the program. These implementations can be easily achieved by those skilled in the art from the description of the embodiments described above.

While the present disclosure has been shown and described with reference to certain preferred embodiments thereof, but the present disclosure is not limited thereto. It should be understood by those skilled in the art that various changes and modifications can be made without departing from the spirit of the present disclosure as defined by the appended claims and their equivalents.

In addition, it should be understood by those skilled in the art that since various changes and modifications can be made without departing from the spirit of the present disclosure, the present disclosure is not limited to the above-described embodiments and the accompanying drawings, and all or some of the embodiments may be selectively combined so that various modifications can be made.

What is claimed is:

1. A battery management system, comprising:
a plurality of slave controllers each electrically connectable to a respective one of a plurality of battery modules and each disposed in a respective one of a plurality of regions;
a plurality of temperature sensors each disposed in a respective one of the plurality of regions; and
a master controller communicably coupled to the plurality of temperature sensors by a wired network and communicably coupled to the plurality of slave controllers by a wireless network,
wherein each of the plurality of slave controllers is configured to transmit a temporary identification (ID) to the master controller through the wireless network such that each temporary ID is preassigned to the respective slave controller and each temporary ID does not indicate a region among the plurality of regions having the respective slave controller, and
wherein the master controller is configured to:
select one of a plurality of temporary IDs received from the plurality of slave controllers;
transmit, through the wireless network, an operation command to a corresponding slave controller among the plurality of slave controllers to which the selected temporary ID is preassigned to selectively discharge a corresponding one of the plurality of battery modules such that heat is generated;
after transmitting the operation command, receive a plurality of temperature measurement signals from the plurality of temperature sensors through the wired network;
determine a temperature value of each of the plurality of regions based on the plurality of temperature measurement signals to identify a corresponding region having a maximum temperature value among the plurality of regions;
determine that the corresponding slave controller to which the selected temporary ID is preassigned is disposed in the corresponding region having the maximum temperature value among the plurality of regions, and
set a regular ID to the corresponding slave controller, such that the regular ID indicates the region of the corresponding slave controller.

2. The battery management system of claim 1, wherein the wired network includes a plurality of sensing lines electrically each connected between a respective one of the plurality of temperature sensors and a respective one of a plurality of input ports provided in the master controller on a one-to-one basis.

3. The battery management system of claim 1, wherein the master controller is further configured to transmit the regular ID to the slave controller to which the selected temporary ID is preassigned through the wireless network.

4. A battery pack, comprising:
a plurality of battery modules; and
the battery management system of claim 1 configured to manage the plurality of battery modules.

5. An electric vehicle comprising the battery pack of claim 4.

6. The battery management system of claim 1, wherein each of the plurality of slave controllers comprises a balancing unit electrically connectable to a plurality of battery cells included in a respective battery module of the battery modules to which the slave controller is electrically connected, and wherein the balancing unit is configured to selectively discharge at least one of the plurality of battery cells.

7. The battery management system of claim 6, wherein the operation command comprises a forced balancing signal, and
each of the plurality of slave controllers is configured to activate the balancing unit comprised therein when the forced balancing signal is received through the wireless network.

8. The battery management system of claim 7, wherein the balancing unit is configured to discharge at least one of the plurality of battery cells electrically connected to the balancing unit when the balancing unit is activated.

9. A method for managing a battery system including a plurality of slave controllers electrically each connectable to a respective one of a plurality of battery modules and each disposed in a respective one of a plurality of regions on a one-to-one basis; a plurality of temperature sensors each disposed in a respective one of the plurality of regions on a one-to one basis; and a master controller communicably coupled to the plurality of temperature sensors by a wired network and communicably coupled to the plurality of slave controllers by a wireless network, the method comprising:

transmitting from each of the plurality of slave controllers through the wireless network to the master controller a temporary identification (ID), wherein each temporary ID is preassigned to the respective slave controller and each temporary ID does not indicate a region among the plurality of regions having the respective slave controller;
selecting by the master controller one of a plurality of temporary IDs received from the plurality of slave controllers;
transmitting from the master controller through the wireless network an operation command to the slave controller to which the selected temporary ID is preassigned to selectively discharge a corresponding one of the plurality of battery modules such that heat is generated;
after transmitting the operation command, receiving to the master controller a plurality of temperature measurement signals from the plurality of temperature sensors through the wired network;
determining by the master controller a temperature value of each of the plurality of regions based on the plurality of temperature measurement signals to identify a corresponding region having a maximum temperature value among the plurality of regions;
determining by the master controller that the corresponding slave controller to which the selected temporary ID is preassigned is disposed in the corresponding region having the maximum temperature value among the plurality of regions, and
setting by the master controller a regular ID to the corresponding slave controller, such that the regular ID indicates the region of the corresponding slave controller.

10. The method of claim 2, further comprising transmitting the regular ID to the slave controller to which the selected temporary ID is preassigned.

* * * * *